(12) United States Patent
Wu et al.

(10) Patent No.: US 12,316,924 B2
(45) Date of Patent: May 27, 2025

(54) OPTICAL DEVICE

(71) Applicant: EZCONN CORPORATION, New Taipei (TW)

(72) Inventors: Chin-Tsung Wu, New Taipei (TW); Kuei Hsiang Cheng, New Taipei (TW); Chun Yu Chen, New Taipei (TW)

(73) Assignee: EZCONN CORPORATION, New Taipei (TW)

( * ) Notice: Subject to any disclaimer, the term of this patent is extended or adjusted under 35 U.S.C. 154(b) by 103 days.

(21) Appl. No.: 18/099,306

(22) Filed: Jan. 20, 2023

(65) Prior Publication Data
US 2023/0232079 A1 Jul. 20, 2023

Related U.S. Application Data

(60) Provisional application No. 63/301,080, filed on Jan. 20, 2022.

(51) Int. Cl.
H04B 10/00 (2013.01)
H04B 10/40 (2013.01)
H04N 21/61 (2011.01)

(52) U.S. Cl.
CPC ......... H04N 21/6118 (2013.01); H04B 10/40 (2013.01)

(58) Field of Classification Search
CPC .... H04B 10/40; H04B 10/27; H04B 10/2507; H04J 14/02; H04J 14/023; H04J 14/0245; H04J 14/0246; H04J 14/0247; H04J 14/0282; H04J 14/0227; G02B 6/4246; G02B 6/4214; G02B 6/4215; G02B 6/2938; G02B 6/29362
USPC ...... 398/66, 67, 68, 69, 70, 71, 72, 79, 135, 398/136, 137, 138, 139, 158, 159, 82, 85, 398/87; 385/24, 88, 89, 90, 92, 93, 37
See application file for complete search history.

(56) References Cited

U.S. PATENT DOCUMENTS

| | | | | |
|---|---|---|---|---|
| 6,493,121 | B1 * | 12/2002 | Althaus | G02B 6/4246 398/139 |
| 7,653,309 | B2 * | 1/2010 | Bouda | H04J 14/0252 398/71 |
| 9,435,711 | B2 * | 9/2016 | Wu | G01M 11/3109 |
| 9,784,919 | B2 * | 10/2017 | Wang | G02B 6/4214 |
| 10,855,375 | B2 * | 12/2020 | Xu | H04B 10/25891 |
| 2006/0088255 | A1 * | 4/2006 | Wu | G02B 6/4215 385/92 |
| 2015/0365191 | A1 * | 12/2015 | Lee | H04J 14/08 398/67 |

* cited by examiner

Primary Examiner — Hanh Phan
(74) Attorney, Agent, or Firm — Rankin, Hill & Clark LLP

(57) ABSTRACT

An optical device includes a light guide unit, an optical path conversion unit and an optical transceiver unit. The light guiding unit is connected to the optical fiber and is suitable for transmitting optical signals. The optical path conversion unit is connected to the light guide unit, and is suitable for receiving optical signals and changing the optical path of the optical signals. It is used in the optical transceiver unit for the configuration of two receiving parts and two transmitting parts, which can support the same optical path at the same time with use of two sets of communication protocol systems and the cable TV protocol system.

20 Claims, 2 Drawing Sheets

OPTICAL DEVICE

RELATED APPLICATIONS

This application is a non-provisional of, claims the benefit and priority of Application No. 63/301,080, filed Jan. 20, 2022, which is incorporated herein by reference in its entirety.

TECHNICAL FIELD

The present invention relates to an optical device. More particularly, the invention relates to an optical transceiver that receives at least three kinds of optical system signals and emits at least two kinds of optical system signals.

BACKGROUND

To face the advent of a highly information-based society, communication infrastructure is needed to transmit various kinds of information, such as voice, text, data, images, etc. Accordingly, the optical communication network was developed to replace the conventional copper cable networks for huge information transmission. As known, in the field of optical communication, the optical fiber is especially suitable for serving as the medium for light transmission over long distances due to its advantages of low loss and wide bandwidth.

With the increased demand for high performance and speed, the use of optical fibers in communications has become more widespread. In optical communication systems, light is used to transmit data to remote ends through optical fibers in the form of light pulses rather than electrical current. Optical fiber transceivers are an important part of communication systems and can be classified according to fiber mode, transmission rate, transmission distance, wavelength and connector type. In the field of optical fiber cable communication, the optical transmission module (Transceiver) has the role of linking the past and the future. Its main function is to convert optical signals into electrical signals, or convert electrical signals into optical signals. One of the optical transmission module type transceivers is a bidirectional transceiver (BiDi), and the main component of BOSA is a Bi-Directional Optical Sub-Assembly.

BOSA uses two independent wavelength channels, one is used to send and receive between the interconnecting equipment through a single fiber bundle, and the transmit wavelength at one end and the receive wavelength at the other end match each other. BOSA can transmit (Tx) data and receive (Rx) data separately at each end.

Generally speaking, BOSA is made up of light emitter, wherein said light emitter has like laser diode, has the light receiver of light receiving source, can let the light of one wavelength pass but reflect another at the same time. A wavelength optical filter, and an optical transmitter capable of simultaneously outputting the emitted light and inputting the received light, and the above-mentioned components are all covered by a casing. After passing through the optical transmitter, the Tx data is transmitted to the optical fiber in the optical connector through the wavelength filter, and the Rx data is transmitted to the optical receiver through the filter after passing through the optical fiber.

For example, one of an optical transmission sub-module is shown as FIG. 1. In FIG. 1, the optical transmission sub-module 1 includes an optical transmitter 11 capable of outputting and receiving light at the same time and an optical receiver 12 having a light receiving source. In other words, this structure is only suitable for one system of communication protocols. As the demand for data transmission speed increases, the old network system needs to be upgraded to the new system to load a large amount and fast data transmission, and there is a handover period during the upgrade process, that is, during the upgrade process, it needs to serve users who maintain the old network system and upgrade to the new network system at the same time. When there are two systems for the modem in the office building or the transfer station, it is impossible to use one modem to solve it. Therefore, improving the structure of the optical transmission sub-module to cope with the situation of serving two systems at the same time has become an important issue to be considered in the field of optical fiber cable communication.

In view of the above, there are many bottlenecks in the prior art, the present invention overcomes the above problems, and proposes a practical optical device.

SUMMARY

One purpose of the present invention is to provide a kind of optical device, this device can simultaneously support the use of two communication systems and a cable TV system, to solve the problem of needing to rearrange optical fiber transmission line and replace data machine.

Another object of the present invention is to provide a kind of optical device, this module can simultaneously install two groups of receiving parts and transmitting parts, and a cable TV receiver in the narrow space, to solve the problem that only one group receiver and transmitter can be set in a module.

To achieve the above-mentioned purpose, the present invention proposes an optical device. The optical device comprises a light guiding unit, an optical path conversion unit and an optical transceiver unit. The light guiding unit connects to an optical fiber and adapted to transmit an optical signal, and the optical signal is not a single wavelength. The optical path conversion unit connects to the light guide unit, adapted to receive the optical signal and change the optical path of the optical signal. The light path conversion unit includes a first collimating lens, an optical time domain reflectometer lens, and a second filter, a first filter, a third filter, and a fourth filter, a second collimating lens, and a fifth filter, which are sequentially arranged along the direction toward the light guide unit. The optical transceiver unit is suitable for receiving and transmitting the optical signal, and suitable for two sets of communication protocol systems and a cable TV system. The optical transceiver unit includes a cable TV system receiver, a first receiving element and a second receiving element, and a fourth emitting element. The cable TV system receiver is set corresponding to the third filter. The first receiving element is set corresponding to the first filter. The second receiving element is set corresponding to the fourth filter. The third emitting element is set corresponding to the fifth filter. The fourth emitting element is set corresponding to the fifth filter. Wherein the first receiving element and the second receiving element are respectively disposed corresponding to one of the third transmitting element and the fourth transmitting element.

In some embodiments, when the optical signal is transmitted to the first filter, the incident angle of the optical signal entering the first filter is 26.5 to 36.5 degrees.

In some embodiments, the optical signal is transmitted to the second filter, the incident angle of the optical signal entering the second filter is 8 to 18.5 degrees.

In some embodiments, the optical signal is transmitted to the third filter, the incident angle of the optical signal entering the third filter is 40 to 50 degrees.

In some embodiments, when the optical signal is transmitted to the fourth filter, the incident angle of the optical signal entering the fourth filter is 40 to 50 degrees.

In some embodiments, when the optical signal is transmitted to the fifth filter, the incident angle of the optical signal entering the fourth filter is 40 to 50 degrees.

In some embodiments, wherein the cable TV system receiver has a receiving wavelength range of 1550 to 1560 nm.

In some embodiments, wherein the first receiving element has a receiving wavelength range of 1575 to 1580 nm.

In some embodiments, wherein the second receiving element has a receiving wavelength range of 1490 nm to 1500 nm.

In some embodiments, wherein the third emitting element emits a wavelength in the range of 1300 nm to 1320 nm.

In some embodiments, the fourth emitting element has an emission wavelength range of 1260 nm to 1280 nm.

In some embodiments, the optical time domain reflector lens is used to pass the wavelength range from 1615 nm to 1660 nm.

Accordingly, the present invention provides proposes an optical device, which is used in the optical transceiver unit to carry out the configuration of two receiving parts, two transmitting parts, and a cable TV part, and can be simultaneously on the same optical path. Supports the use of two sets of communication protocols and the cable TV system. In addition, by setting the angle of each filter in the optical path conversion unit, two sets of receivers and transmitters and the cable TV receiver can be installed in a narrow space, which not only does not increase the overall occupied space, but also maintains a good signal transmission effect.

BRIEF DESCRIPTION OF THE DRAWINGS

Unless specified otherwise, the accompanying drawings illustrate aspects of the innovative subject matter described herein. Referring to the drawings, wherein like reference numerals indicate similar parts throughout the several views, several examples of heatsink fins incorporating aspects of the presently disclosed principles are illustrated by way of example, and not by way of limitation.

DETAILED DESCRIPTION

Figure 1:
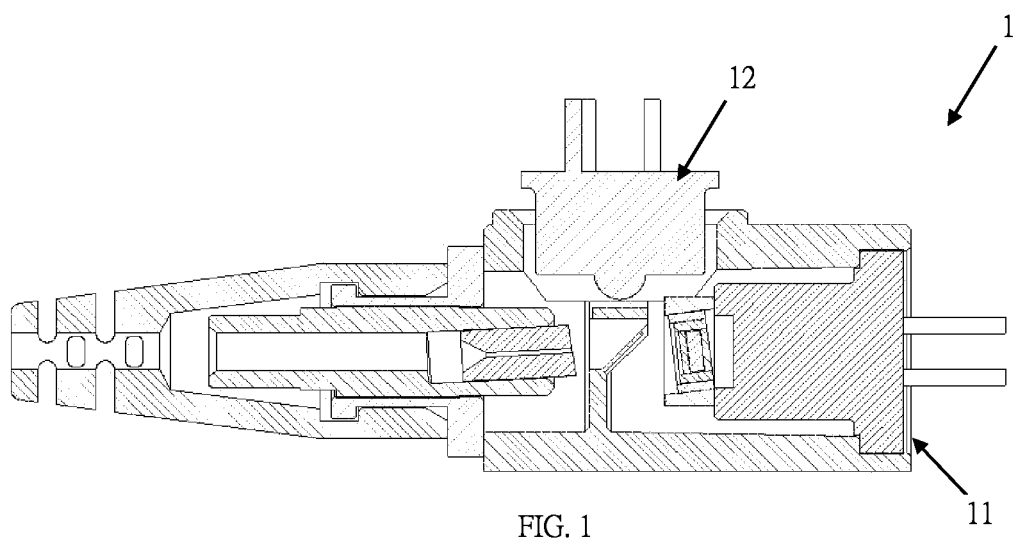
FIG. 1 depicts an optical transmission sub-module of the prior art.

To solve the problems in prior art, an optical inspection device is disclosed in the present invention. The optical inspection device of the present invention can detect and/or inspect different positions of an object at the same time without significant changes of the structure and/or element of the interferometer, and can obtain the coherence effect optical information of different optical path. Thus, the optical information can be processed and analyzed. Also, the present invention can be applied to various field of inspection and/or detection, particularly in biological detection/inspection, industrial detection/inspection, semiconductor industrial detection/inspection and so on.

Unless specified otherwise, the accompanying drawings illustrate aspects of the innovative subject matter described herein. Referring to the drawings, wherein like reference numerals indicate similar parts throughout the several views, several examples of coaxial cable connector incorporating aspects of the presently disclosed principles are illustrated by way of example, and not by way of limitation.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The embodiment disclosed in this case is an optical device. For example, the optical device can be installed in the optical network unit (ONU) at the customer end of the passive optical network (PON) system. This system is fiber to the curb (FTTC), fiber to the building (FTTB) or fiber-to-the-home (FTTH) systems, using point-to-multipoint network architecture and FTTC, FTTB, FTTH systems and equipment used in remote user residences.

Figure 2:
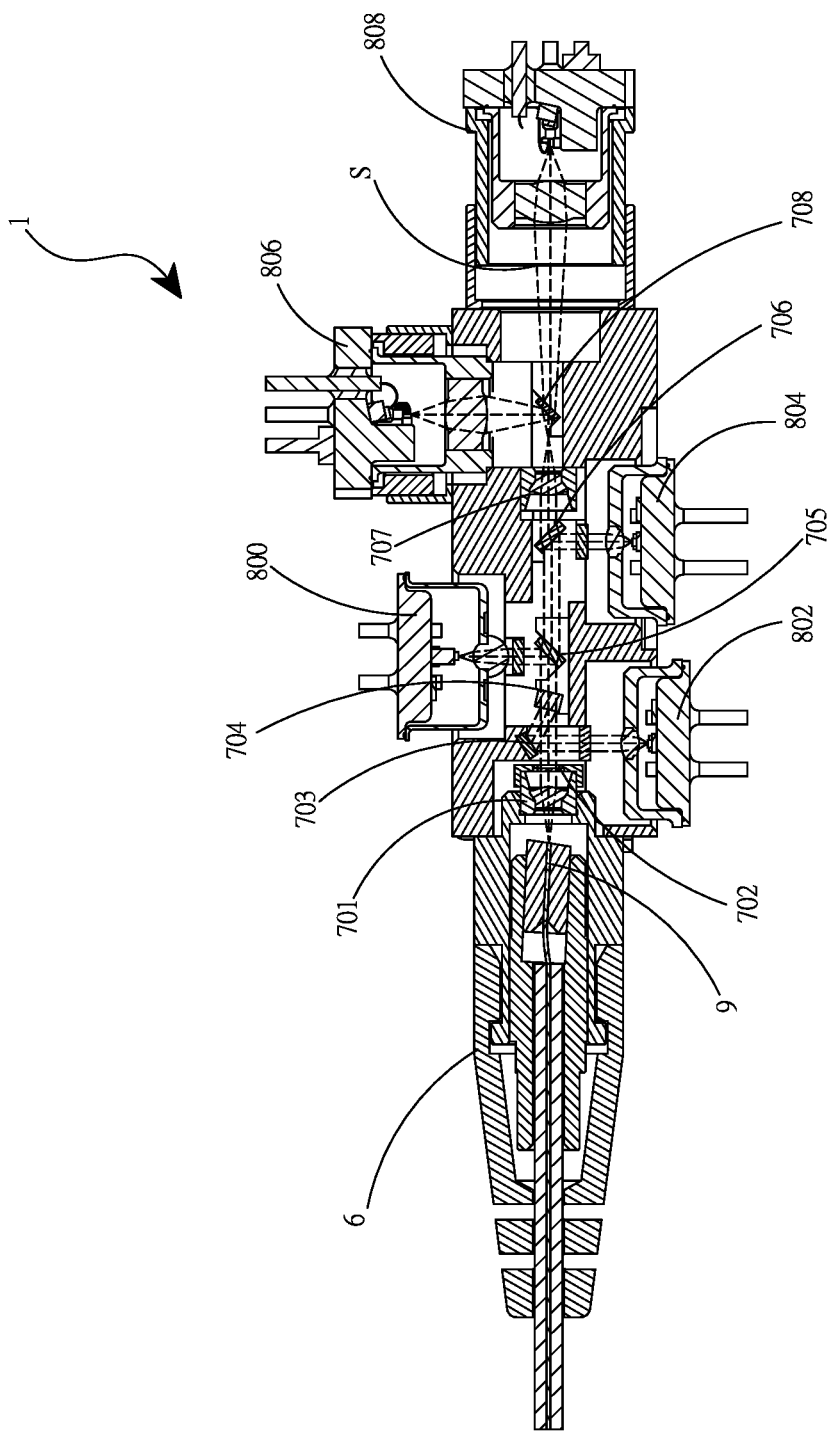
FIG. 2 depicts an optical device according to various embodiments of this invention.

First, the structural appearance and preliminary functions of the optical device in this case will be described. Please refer to FIG. 2, which is a schematic structural diagram of the optical device of the present invention. The optical device 1 includes a light guide unit 6, an optical path conversion unit and an optical transceiver unit. The light guide unit 6 is connected to the optical fiber 9, and the light guide unit 6 is adapted to output optical signals. The light path conversion unit is connected to the light guide unit 6 and is adapted to receive the light signal and change the light path of the light signal. The optical transceiver unit is suitable for receiving and transmitting optical signals. The optical transceiver unit includes a cable TV system receiver 800, a first receiving element 802, and a second receiving element 804, a third transmitting element 806, a fourth transmitting element 808. The first receiving element 802 and the second receiving element 804 are disposed correspondingly to one of the third transmitting element 806 and the fourth transmitting element 808, respectively. In other words, the receiving element and the transmitting element are arranged in pairs, and the installation positions of the receiving element and the transmitting element in FIG. 2 are only schematic diagrams in the embodiment, and the actual installation positions are still determined according to the layout requirements.

Next, the internal structure of the optical device of the present case is further disclosed through a cross-sectional view. The optical device 1 includes a light guide unit 6, an optical path conversion unit and an optical transceiver unit. The light path conversion unit is connected to the light guide unit 6 and includes a first collimating lens 701, an optical time domain reflectometer lens 702, and a second filter 704, a first filter 703, a third filter 705, and a fourth filter 706, a second collimating lens 707, and a fifth filter 708. The optical transceiver unit includes a cable TV system receiver 800, a first receiving element 802, and a second receiving element 804, a third transmitting element 806, a fourth transmitting element 808. Wherein, the cable TV system receiver 800 is set corresponding to the third filter 705. The first receiving element 802 is set corresponding to the first filter 703. The second receiving element 804 is set corresponding to the fourth filter 706. The third transmitting element 806 is set corresponding to the fifth filter 708. The fourth transmitting element 808 is set corresponds to the fifth filter 708.

The design positions of the above-mentioned filters, receiving parts and transmitting parts will be further described here. It should be noted that, because the device that can install the module of this case is usually located in a relatively narrow space, how to simplify the arrangement of components and reduce the overall space while achieving a good balance is the main consideration when designing the position of the above-mentioned components. In this case, the primary consideration is whether the transmission path of the optical signal is blocked. Once the optical signal is blocked, the transmission effect will be reduced. Therefore, it is necessary to provide a suitable installation space for the receiver and/or the transmitter. However, the movement of any receiver and/or transmitter will increase the collision between components. In addition, when moving the receiving element and/or the transmitting element, the collimating lens and filter inside the optical path conversion unit also need to be adjusted accordingly. In order to reduce the effect of the light spot affecting the signal transmission, the filter at the transmitting end is usually Installed near the light focusing point of the emitting element, the small spot filter can be used in a small size to save space. Therefore, under the consideration of layers, the design of components in the light adjustment unit is a big challenge.

Under the above considerations, the detailed path of the light in the optical path conversion unit will be further described here. Since the filtering wavelength of each filter is determined by the requirements of the receiving element and/or the transmitting element corresponding to the filter, only the angle of each filter is described in this case. The way of defining the filter angle is determined by the angle at which the light is incident on the filter. That is, in the optical device 1 described in this case, when the optical signal S (dotted line) is transmitted to the first filter 703, the incident angle of the optical signal S entering the first filter 703 is 26.5 to 36.5 degrees, and in this embodiment, it is 31.5 degrees. When the optical signal S is transmitted to the second filter 704, the incident angle of the optical signal S entering the second filter 704 is 8.5 to 18.5 degrees, and in this embodiment, it is 13.5 degrees. When the optical signal S is transmitted to the third filter 705, the incident angle entering the third filter 705 is 40 to 50 degrees, and in this embodiment, it is 45 degrees. When the optical signal is transmitted to the fourth filter 706, the incident angle of the optical signal S entering the fourth filter 706 is 40 to 50 degrees and in this embodiment, it is 45 degrees. When the optical signal is transmitted to the fifth filter 708, the incident angle of the optical signal S entering the fifth filter 708 is 40 to 50 degrees, and in this embodiment, it is 45 degrees.

It should be noted that the optical signal in this case is not a single wavelength, and in the case of different wavelengths, if the optical signal is directly transmitted to the light guide unit, the optical signal may be disturbed and resulting in poor reception. Therefore, a first collimating lens and a second collimating lens are arranged in the optical device of the present case, and the two collimating lenses can make the optical signal form parallel light, which is convenient for the receiving element to receive.

In the optical device of the present invention, the cable TV system receiver has a receiving wavelength range of 1550 to 1560 nm. The first receiving element receives wavelengths ranging from 1575 nm to 1580 nm. The second receiving element has a receiving wavelength range from 1480 nm to 1500 nm. The third emitting element has an emission wavelength range of 1300 nm to 1320 nm. The fourth emitting element has an emission wavelength range of 1260 nm to 1280 nm. And the difference in emission wavelength range between the third emitting element and the fourth emitting element is not greater than 60 nm. The optical time domain reflector lens is used to pass the wavelength range from 1615 nm to 1660 nm.

Using the optical device described in the present invention, the services of two communication protocol systems can be provided simultaneously in the same structure. For example, GPON (Gigabit-Capable Passive Optical network) can be served simultaneously with XGS-PON (10 Gigabit-Capable Symmetric Passive Optical network). Of course, the above communication system is only an example, and any communication system that can be applied to the optical device in this case should not go beyond the scope of the present invention.

Accordingly, the present invention discloses an optical device, and has the following advantages.

1. Combining dual-system components and the cable TV component in the same module makes it unnecessary to disassemble additional hardware devices such as modems when replacing or using two communication systems at the same time, greatly reducing the cost of replacing the system.

2. Through the setting of the collimating lens, the optical signal can be parallel light, which improves the quality of the optical signal received by the receiver.

3. With the setting of the optical time domain reflector lens, it occupies a small space, which not only increases the feasibility of designing and arranging other components, greatly saves the overall space, but also increases the optical signal detection function, making the overall optical module function more diverse.

The presently disclosed inventive concepts are not intended to be limited to the embodiments shown herein, but are to be accorded their full scope consistent with the principles underlying the disclosed concepts herein. Directions and references to an element, such as "up," "down,", "upper," "lower," "horizontal," "vertical," "left," "right," and the like, do not imply absolute relationships, positions, and/or orientations. Terms of an element, such as "first" and "second" are not literal, but, distinguishing terms. As used herein, terms "comprises" or "comprising" encompass the notions of "including" and "having" and specify the presence of elements, operations, and/or groups or combinations thereof and do not imply preclusion of the presence or addition of one or more other elements, operations and/or groups or combinations thereof. Sequence of operations do not imply absoluteness unless specifically so stated. Reference to an element in the singular, such as by use of the article "a" or "an", is not intended to mean "one and only one" unless specifically so stated, but rather "one or more". As used herein, "and/or" means "and" or "or", as well as "and" and "or." As used herein, ranges and subranges mean all ranges including whole and/or fractional values therein and language which defines or modifies ranges and subranges, such as "at least," "greater than," "less than," "no more than," and the like, mean subranges and/or an upper or lower limit. All structural and functional equivalents to the elements of the various embodiments described throughout the disclosure that are known or later come to be known to those of ordinary skill in the relevant art are intended to be encompassed by the features described and claimed herein. Moreover, nothing disclosed herein is intended to be dedicated to the public regardless of whether such disclosure may ultimately explicitly be recited in the claims. No element or concept disclosed herein or hereafter presented shall be construed under the provisions of 35 USC 112(f) unless the element or concept is expressly recited using the phrase "means for" or "step for".

In view of the many possible embodiments to which the disclosed principles can be applied, we reserve the right to claim any and all combinations of features and acts described herein, including the right to claim all that comes within the scope and spirit of the foregoing description, as well as the combinations recited, literally and equivalently, in the following claims and any claims presented anytime throughout prosecution of this application or any application claiming benefit of or priority from this application.

What is claimed is:

1. An optical device, comprising:
   a light guiding unit, connected to an optical fiber and adapted to transmit an optical signal, and the optical signal is not a single wavelength;
   an optical path conversion unit, connected to the light guide unit, adapted to receive the optical signal and change the optical path of the optical signal, the light path conversion unit includes a first collimating lens, an optical time domain reflectometer lens, and a second filter, a first filter, a third filter, and a fourth filter, a second collimating lens, and a fifth filter, which are sequentially arranged along the direction toward the light guide unit; and
   an optical transceiver unit, suitable for receiving and transmitting the optical signal, suitable for two sets of communication protocol systems and a cable TV system, the optical transceiver unit includes:
   a cable TV system receiver, which is set corresponding to the third filter;
   a first receiving element, which is set corresponding to the first filter;
   a second receiving element, which is set corresponding to the fourth filter;
   a third emitting element, which is set corresponding to the fifth filter;
   a fourth emitting element, which is set corresponding to the fifth filter; and
   wherein, the first receiving element and the second receiving element are respectively disposed corresponding to one of the third transmitting element and the fourth transmitting element.

2. The optical device according to claim 1, wherein when the optical signal is transmitted to the first filter, the incident angle of the optical signal entering the first filter is 26.5 to 36.5 degrees.

3. The optical device according to claim 1, wherein when the optical signal is transmitted to the second filter, the incident angle of the optical signal entering the second filter is 8 to 18.5 degrees.

4. The optical device according to claim 1, wherein when the optical signal is transmitted to the third filter, the incident angle of the optical signal entering the third filter is 40 to 50 degrees.

5. The optical device as claimed in claim 1, wherein when the optical signal is transmitted to the fourth filter, the incident angle of the optical signal entering the fourth filter is 40 to 50 degrees.

6. The optical device as claimed in claim 1, wherein when the optical signal is transmitted to the fifth filter, the incident angle of the optical signal entering the fourth filter is 40 to 50 degrees.

7. The optical device as claimed in claim 1, wherein the cable TV system receiver has a receiving wavelength range of 1550 nm to 1560 nm.

8. The optical device as claimed in claim 1, wherein the first receiving element has a receiving wavelength range of 1575 nm to 1580 nm.

9. The optical device according to claim 1, wherein the second receiving element has a receiving wavelength range of 1490 nm to 1500 nm.

10. The optical device as claimed in claim 1, wherein the third emitting element emits a wavelength in the range of 1300 nm to 1320 nm.

11. The optical device according to claim 1, wherein the fourth emitting element has an emission wavelength range of 1260 nm to 1280 nm.

12. The optical device according to claim 1, wherein the optical time domain reflector lens is used to pass the wavelength range from 1615 nm to 1660 nm.

13. An optical device comprising:
   a light guiding unit connected to an optical fiber;
   an optical path conversion unit comprising:
      a first collimating lens;
      an optical time domain reflectometer lens;
      five wavelength-selective filters sequentially arranged at predetermined angles, wherein:
         the first filter is arranged at an incident angle of 26.5 to 36.5 degrees;
         the second filter is arranged at an incident angle of 8-18.5 degrees;
         the third through fifth filters are arranged at incident angles of 40 to 50 degrees; and
      a second collimating lens; and
   an optical transceiver unit comprising:
      a cable TV receiver operating in the 1550-1560 nm range;
      a first receiving element operating in the 1575-1580 nm range;
      a second receiving element operating in the 1490-1500 nm range;
      a third transmitting element operating in the 1300-1320 nm range; and
      a fourth transmitting element operating in the 1260-1280 nm range,
   wherein the optical transceiver unit simultaneously supports two different optical network protocols.

14. The optical device of claim 13, wherein the first and second collimating lenses are configured to maintain parallel light transmission between the filters.

15. The optical device of claim 13, wherein the wavelength-selective filters are thin-film filters having a thickness between 0.1 mm and 0.3 mm.

16. The optical device of claim 13, wherein the optical time domain reflectometer lens is configured to pass wavelengths from 1615 nm to 1660 nm for network diagnostic purposes.

17. The optical device of claim 13, further comprising a temperature compensation mechanism to maintain filter angles within ±0.5 degrees of their predetermined angles.

18. The optical device of claim 13, wherein the optical path conversion unit is housed within a space having a maximum dimension of 25 mm.

19. The optical device of claim 13, wherein the five wavelength-selective filters are mounted on a single substrate to maintain their relative angular positions.

20. An optical network unit comprising the optical device of claim 13, wherein the optical network unit is configured to simultaneously process:

cable TV signals in the 1550-1560 nm range;
GPON signals in the 1490-1500 nm range; and
XGS-PON signals in the 1575-1580 nm range.

\* \* \* \* \*